(12) United States Patent
Marcheret et al.

(10) Patent No.: US 10,181,325 B2
(45) Date of Patent: *Jan. 15, 2019

(54) AUDIO-VISUAL SPEECH RECOGNITION WITH SCATTERING OPERATORS

(71) Applicant: Nuance Communications, Inc., Burlington, MA (US)

(72) Inventors: Etienne Marcheret, White Plains, NY (US); Josef Vopicka, Prague (CZ); Vaibhava Goel, Chappaqua, NY (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,149

(22) Filed: Jun. 30, 2017

(65) Prior Publication Data
US 2018/0025729 A1  Jan. 25, 2018

Related U.S. Application Data

(63) Continuation of application No. 14/835,319, filed on Aug. 25, 2015, now Pat. No. 9,697,833.

(51) Int. Cl.
*G10L 15/25* (2013.01)
*G10L 15/16* (2006.01)
(Continued)

(52) U.S. Cl.
CPC .......... *G10L 15/25* (2013.01); *G06K 9/00718* (2013.01); *G06K 9/00744* (2013.01);
(Continued)

(58) Field of Classification Search
CPC ......... G10L 15/25; G10L 15/16; G10L 21/02; G06K 9/00718; G06K 9/4671; G06K 9/52; G06K 9/66; G06T 7/60
See application file for complete search history.

(56) References Cited

U.S. PATENT DOCUMENTS 5,621,858 A * 4/1997 Stork ................. G06K 9/00268
382/156
7,480,617 B2  1/2009 Chu et al.
(Continued)

OTHER PUBLICATIONS

Muller,Florian, "Feature Extraction with a Multiscale Modlation Analysis for Robust Automatic Speech Recognition," Institute for Signal Processing University of Lubeck, 5 pages (2013).
(Continued)

*Primary Examiner* — David F Dunphy
(74) *Attorney, Agent, or Firm* — Brian J. Colandero; Michael T. Abramson; Holland & Knight LLP

(57) ABSTRACT

Aspects described herein are directed towards methods, computing devices, systems, and computer-readable media that apply scattering operations to extracted visual features of audiovisual input to generate predictions regarding the speech status of a subject. Visual scattering coefficients generated according to one or more aspects described herein may be used as input to a neural network operative to generate the predictions regarding the speech status of the subject. Predictions generated based on the visual features may be combined with predictions based on audio input associated with the visual features. In some embodiments, the extracted visual features may be combined with the audio input to generate a combined feature vector for use in generating predictions.

20 Claims, 9 Drawing Sheets

(51) Int. Cl.
  G06K 9/46    (2006.01)
  G06K 9/00    (2006.01)
  G06K 9/66    (2006.01)
  G06K 9/52    (2006.01)
  G10L 21/02   (2013.01)
  G06T 7/60    (2017.01)
(52) U.S. Cl.
  CPC ............. *G06K 9/4671* (2013.01); *G06K 9/52* (2013.01); *G06K 9/66* (2013.01); *G06T 7/60* (2013.01); *G10L 15/16* (2013.01); *G10L 21/02* (2013.01); *G06K 2009/4666* (2013.01)

(56) References Cited

U.S. PATENT DOCUMENTS

| 8,121,840 B2 | 2/2012 | Chu et al. |
| 2004/0267521 A1* | 12/2004 | Cutler ..................... G10L 15/25 704/202 |
| 2016/0155049 A1 | 6/2016 | Choi |

OTHER PUBLICATIONS

Keller,Yosi, "Audio-Visual Group Recognition Using Diffusion Maps," IEEE Transactions on Signal Processing, 11 pages (Jan. 2010).
Zhang,C, "A Deep Representation for Invariance and Music Classification," Center for Brains, Minds & Machines, 6 pages (Mar. 17, 2014).
Anden, Joakim, "Deep Scattering Spectrum," Transactions on Signal Processing, 15 pages (Jan. 10, 2014).
Dov, David, "Audio-Visual Speech Processing Using Diffusion Maps and The Scattering Transform," Senate of the Technion Israel Institute of Technology, 95 pages (Nov. 2014).
Bruna, Joan, "Classification with Scattering Operators," CMAP, Ecole Polytechnique, 18 pages (Nov. 17, 2010).
Potamianos, Gerasimos, "Recent Advances in the Automatic Recognition of Audio-Visual Speech," Proceedings of the IEEE, 19 pages (Draft manuscript dated Dec. 20, 2002).
Wikipedia, the free encyclopedia, "Mel-frequency cepstrum," 4 pages (Accessed: Jan. 19, 2015), available at http://en.wikipedia.org/wiki/Melfrequency_ cepstrum.
Practical cryptography, "Mel Frequency Cepstral Coefficient (MFCC) tutorial," 11 pages (Accessed: Jan. 19, 2015), available at http://www.practicalcryptography.com/miscellaneous/machinelearning/guidemelfrequencycepstralcoefficientsmfccs/.
K. Kumar, G. Potamianos, J. Navratil, E. Marcheret, and V. Libal, "Audio-visual speech synchrony detection by a family of bimodal linear prediction models," in Multibiometrics for Human Identification. Cambridge University Press, 2011, pp. 31-50.
E. A. Rua, H. Bredin, C. G. Mateo, G. Chollet, and D. G. Jimenez, "Audio-visual speech asynchrony detection using co-inertia analysis and coupled hidden markov models," Pattern Analysis and Applications, vol. 12, No. 3, pp. 271-284, 2009.
K. Kumar, J. Navratil, E. Marcheret, V. Libal, and G. Potamianos, "Robust audio-visual speech synchrony detection by generalized bimodal linear prediction," in Proceedings of the 10th International Conference of the Speech Communication Association (Interspeech), 2009, pp. 2251-2254.
B. P. Yuhas, M. H. Goldstein, Jr., and T. J. Sejnowski, "Integration of acoustic and visual speech signals using neural networks," IEEE Communications Magazine, vol. 27, No. 11, pp. 65-71, 1989.
G. Hinton, L. Deng, D. Yu et al., "Deep neural networks for acoustic modeling in speech recognition: The shared views of four research groups," IEEE Signal Processing Magazine, vol. 29, No. 6, pp. 82-97, 2012.
J. Ngiam, A. Khosla, M. Kim, J. Nam, H. Lee, and A. Y. Ng, "Multimodal deep learning," in Proceedings of the 28th International Conference on Machine Learning, 2011.
Y. Mroueh, E. Marcheret, and V. Goel, "Deep multi-modal learning for audio-visual speech recognition," in Proceedings of the IEEE International Conference on Acoustics, Speech and Signal Processing (ICASSP), 2015, to appear.
G. Potamianos, C. Neti, G. Gravier, A. Garg, and A. W. Senior, "Recent advances in the automatic recognition of audio-visual speech," Proceedings of the IEEE, vol. 91, No. 9, pp. 1306-1326, 2003.
L. Sifre and S. Mallat, "Rotation, scaling and deformation invariant scattering for texture discrimination," in Proceedings of the IEEE Computer Vision and Pattern Recognition Conference, 2013.
J. Bruna and S. Mallat, "Invariant scattering convolution networks," IEEE Transactions on Pattern Analysis and Machine Intelligence, vol. 35, No. 8, pp. 1872-1886, 2013.
M. Castrillon, O. Deniz, D. Hernandez, and J. Lorenzo, "A comparison of face and facial feature detectors based on the Viola-Jones general object detection framework," Machine Vision and Applications, vol. 22, No. 3, pp. 481-494, 2011.
P. Duchnowski, U. Meier, and A. Waibel, "See me, hear me: Integrating automatic speech recognition and lipreading," in Proceedings of the International Conference on Spoken Language Processing (ICSLP), 1994, pp. 547-550.
H. Bredin and G. Chollet, "Audiovisual speech synchrony measure: Application to biometrics," EURASIP Journal on Advances in Signal Processing, 2007.
R. Cutler and L. Davis, "Look who's talking: Speaker detection using video and audio correlation," in Proceedings of the IEEE International Conference on Multimedia and Expo (ICME), vol. 3, 2000, pp. 1589-1592.
J. P. Barker and F. Berthommier, "Evidence of correlation between acoustic and visual features of speech," in Proceedings of the International Congress of Phonetic Sciences (ICPhS), 1999, pp. 199-202.
J. W. W Fisher, III and T. Darrell, "Speaker association with signal-level audiovisual fusion," IEEE Transactions on Multimedia, vol. 6, pp. 406-413, 2004.
M. Gurban and J.-P. Thiran, "Multimodal speaker localization in a probabilistic framework," in Proceedings of the 14th European Signal Processing Conference (Eusipco), 2006, pp. 4-8.
M. E. Sargin, Y. Yemez, E. Erzin, and A. M. Tekalp, "Audio-visual synchronization and fusion using canonical correlation analysis," IEEE Transactions on Multimedia, vol. 9, No. 7, pp. 1396-1403, 2007.
G. Chetty and M.Wagner, "Liveness verification in audio-video speaker authentication," in Proceedings of the 10th Australian International Conference on Speech Science and Technology (SST), 2004, pp. 358-363.
N. Eveno and L. Besacier, "A speaker independent "Liveness" test for audio-visual biometrics," in Proceedings of the 9th European Conference on Speech Communication and Technology (Interspeech—EuroSpeech), 2005, pp. 3081-3084.
H. J. Nock, G. Iyengar, and C. Neti, "Speaker localization using audio-visual synchrony: An empirical study," in Proceedings of the ACM International Conference on Image and Video Retrieval (CIVR), vol. LNCS 2728, 2003, pp. 488-499.
M. Slaney and M. Covell, "FaceSync: a linear operator for measuring synchronization of video facial images and audio tracks," in Advances in Neural Information Processing Systems, vol. 13. MIT Press, 2000, pp. 814-820.
J. Hershey and J. Movellan, "Audio vision: Using audio-visual synchrony to locate sounds," in Advances in Neural Information Processing Systems, vol. 12. MIT Press, 1999, pp. 813-819.
T. Butz and J.-P. Thiran, "Feature space mutual information in speech-video sequences," in Proceedings of the IEEE International Conference on Multimedia and Expo (ICME), vol. 2, 2002, pp. 361-364.
H. J. Nock, G. Iyengar, and C. Neti, "Assessing face and speech consistency for monologue detection in video," in Proceedings of the 10th ACM International Conference on Multimedia, 2002, pp. 303-306.

(56) References Cited

OTHER PUBLICATIONS

D. R. Hardoon, S. Szedmk, and J. Shawe-Taylor, "Canonical correlation analysis: An overview with applications to learning methods," Neural Computation, vol. 16, No. 12, pp. 2639-2664, 2004.

Chang et al, "Intensity Rank Estimation of Facial Expressions Based on a Single Image," 2013, IEEE International Conference on Systems, Man, and Cybernetics, pp. 3157-3162.

Anden et al, "Deep Scattering Spectrum," 2014, IEEE Transactions on Signal Processing 62.16, pp. 1-15.

Dov et al, "Audio-Visual Voice Activity Detection Using Diffusion Maps," Apr. 2015, IEEE/ACM Transactions on Audio, Speech, and Language Processing, vol. 23, No. 4, pp. 732-745.

* cited by examiner

AUDIO-VISUAL SPEECH RECOGNITION WITH SCATTERING OPERATORS

CROSS REFERENCE TO RELATED APPLICATION

This application is a continuation of U.S. patent application Ser. No. 14/835,319, filed Aug. 25, 2015, entitled "Audio-Visual Speech Recognition with Scattering Operators," which is related to U.S. patent application Ser. No. 14/696,803, entitled "Methods and Apparatus for Speech Recognition Using Visual Information," filed Apr. 29, 2015, the disclosures of which are incorporated herein in their entirety.

TECHNICAL FIELD

The present application generally relates to computer recognition of speech and relates, in particular, to use of scattering operators in audio-visual speech recognition processes.

BACKGROUND

Automatic speech recognition and speaker detection are becoming increasingly important areas of application for computer hardware and software development. Methods have been developed to extract features from an audio stream, analyze individual portions of the audio stream, and recognize human speech content contained in the audio stream. Extracted features may be used to generate derivative values such as Mel Frequency Cepstral Coefficients (MFCCs) which may be processed using techniques such as linear discriminant analysis (LDA), delta, double delta, and the like. The details regarding the use of MFCCs in automatic speech recognition are well-known to those of ordinary skill in the art.

Recent research has also explored the use of an associated video stream in enhancing predictions regarding the content of the audio stream. The video stream may be analyzed to determine whether the audio and video streams are in-sync. The analysis of the video stream may also reveal whether a speaker is currently speaking.

Detecting whether the video of a speaking person in front head pose corresponds to an accompanying audio track may be of interest in a wide range of applications. For example, in multi-subject videos, it may be desirable to detect a currently speaking subject to improve performance of speaker diarization/speaker turn detection, or speech separation in the case of overlapping speech, over uni-modal systems that employ traditional audio-only or visual-only processing techniques. As another example, in audio-visual biometrics, spoofing attacks may involve audio and visual data stream that are not in sync. This may occur where an impostor has obtained access to a unimodal target "fingerprint" (such as a recorded audio sample). As another example, in movies, successful lip-syncing/audio dubbing across languages may require that a newly generated audio track is well synchronized to the visual speech articulator motion of the actors in the original video. Finally, storage or transmission bandwidth limitations may cause the loss of blocks of video frames, thus resulting in poor quality video that may not match the audio track accurately. Each of the above problems may be addressed by reliably detecting audio-visual synchrony, indicating consistency between the audio and visual streams.

Similarly, a multi-modal approach employing audio and visual analysis may allow enhanced recognition of speech content during automatic speech recognition processing. Accurate and reliable interpretation of the video stream may allow for improved recognition of phonemes and other utterances contained in human speech. However, traditional methods of analyzing visual features associated with a speaker are both inaccurate and inefficient.

In view of the challenges discussed above, a continued need exists for improved approaches to improving the accuracy and efficiency of audiovisual speech recognition. In particular, there is a need for accurate and efficient visual processing techniques for use in processing a video stream associated with a speaker.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome the challenges discussed above, and to overcome other challenges that will be apparent upon reading and understanding the present specification, aspects described herein are directed towards methods, computing devices, systems, and computer-readable media that apply scattering operations to extracted visual features of audiovisual input to generate predictions regarding the speech status of a subject. Visual scattering coefficients generated according to one or more aspects described herein may be used as input to a neural network operative to generate the predictions regarding the speech status of the subject. Predictions generated based on the visual features may be combined with predictions based on audio input associated with the visual features. In some embodiments, the extracted visual features may be combined with the audio input to generate a combined feature vector for use in generating predictions.

The predictions generated by the system may be useful in recognizing various characteristics about the speech status of the subject. For example, the predictions may be used to assist in recognizing the content of speech associated with the subject (automatic speech recognition, or "ASR"), determining whether the subject is speaking ("AV-liveness" or "liveness"), determining whether speech originates from a foreground or background source (foreground/background detection), and/or determining whether an audio component and a video component of the audiovisual input are in-sync ("AV-synchrony"), for example.

Some aspects described herein may provide methods for generating a prediction regarding a speech status of a subject based on analysis of audiovisual input. In some embodiments, the method may comprise receiving, by a computing device, audiovisual input comprising audio input and video input associated with a subject. The audiovisual input may be audio input and video input captured by one or more input devices of the computing device and may include audio speech samples and video of the subject speaking. The audiovisual input may be captured in real-time as the subject is speaking in order to facilitate computer speech detection and/or speech recognition. The computing device may extract a set of visual features from the video input. For example, the computing device may identify a region of interest in the captured video input, such as a mouth region, and extract the region of interest for use in further processing. The computing device may apply a scattering operation to the extracted visual features, thereby generating a vector of scattering coefficients. The computing device may provide the vector of scattering coefficients as input to a first neural network for visual processing and generate a first prediction regarding a speech status of the subject based on the vector of scattering coefficients.

In some embodiments, the prediction regarding the speech status of the subject may be used in enhanced automated speech recognition processes by incorporating visual features of the speaker to recognize the content of speech. For example, the computing device may use one or more visual features to assist in determining phonemes and other utterances contained in the audio input. The visual features may be useful to distinguish between similar phonemes, sounds, utterances, and the like. In other embodiments, the computing device may utilize the visual features to automatically recognize speech without needing to process the audio input. The prediction may also be useful to determine whether a subject is speaking (AV-liveness). For example, the computing device may turn on an audio capture device when the visual features indicate that the subject is speaking. The computing device may turn off the audio capture device and/or disregard audio input when the visual features indicate that the subject is not speaking, for example. Similarly, the computing device may utilize the extracted visual features and scattering coefficients to generate a prediction regarding whether a foreground subject or a background actor is the source of audio input features.

According to some aspects described herein, audiovisual input including an audio component and a video component may be sampled over a period of time. In some embodiments, the video input may comprise a plurality of sequential visual frames. In some embodiments, providing the vector of visual scattering features as input to the first neural network for visual processing may comprise aggregating scattering coefficients for a plurality of video frames into a set of aggregated scattering coefficients, wherein the set of aggregated visual feature vectors corresponds to the plurality of sequential visual frames. For example, the method may comprise normalizing the vector of scattering coefficients to generate a first normalized vector of scattering coefficients. The computing device may generate a plurality of normalized vectors of scattering coefficients including the first normalized vector of scattering coefficients to generate a set of aggregated visual feature vectors. Each of the plurality of normalized vectors of scattering coefficients may be associated with a respective frame included in the video input, for example. The computing device may provide the set of aggregated visual feature vectors to the first neural network for visual input processing.

According to some aspects described herein, the method may further utilize a second neural network for processing the audio input. The computing device may provide the audio input to the second neural network and generate a second prediction regarding the speech status of the subject based on the audio input. The first and second predictions may be used by the computing device to recognize speech content of the audiovisual input and/or make determinations such as whether the audio and video input are in-sync, whether the subject is speaking, and/or whether the audio corresponds to a foreground or background speaker. In some embodiments, the video input may be sampled at a first frequency and/or frame rate and the audio input may be sampled at a different second frequency.

For example, the computing device may compare a first output of the first neural network with a second output of the second neural network to determine a synchrony state of the audio input and the video input. The synchrony state may indicate whether the audio input is in-sync with the video input. If the audio and video are determined to be out-of-sync, the computing device may adapt accordingly, such as by adjusting a frame offset/frame number and/or delay associated with the audio and/or video input.

As another example, the computing device may compare a first output of the first neural network with a second output of the second neural network to determine whether the audio input matches the video input associated with the subject. Analysis of the video input may indicate that the subject is not speaking or is saying a first phrase, while analysis of the audio input may indicate that the subject is saying a second phrase. Based on the difference in predictions generated by the first neural network and the second neural network, the computing device may make a prediction regarding whether the audio input corresponds to a foreground or background subject in the video input. This may be useful to detect whether speech originates from a desired and/or target subject or if it originates from ancillary background actors and can be disregarded and/or adjusted for. For example, the computing device may apply one or more filtering operations to the audio input upon determining that a primary component of the audio input is associated with a background subject rather than the foreground primary subject.

While comparison with audio features may provide an improved determination regarding speech liveness and/or foreground/background speaker detection, in some embodiments the computing device may detect speech liveness and foreground/background speech by reference to the visual features and scattering coefficients without needing to compare the visual features with the audio features.

The method may further utilize a third neural network for processing a combined set of audio and visual features. In some embodiments that employ the second neural network for audio processing, the computing device may combine the output of the first neural network with the output of the second neural network to generate a fused audiovisual feature vector based on the audiovisual input. The computing device may provide the fused audiovisual feature vector to the third neural network for audiovisual processing and generate a third prediction regarding the speech status of the subject based on the fused audiovisual feature vector. In other embodiments, the computing device may normalize the audio input to generate normalized audio input. The computing device may combine the vector of scattering coefficients with the normalized audio input to generate a fused audiovisual feature vector. The computing device may then provide the fused audiovisual feature vector to another neural network for audiovisual processing and generate a prediction regarding the speech status of the subject based on the combined audio input and video input, bypassing the neural network for audio-only processing used in other embodiments.

In some embodiments, applying a scattering operation to the extracted visual features to generate a vector of visual scattering features in a first dimensional space may comprise generating first order scattering coefficients and second order scattering coefficients. In some embodiments, the method may involve generating a vector of scattering coefficients in a first dimensional space. The computing device may generate the scattering coefficients in the first dimensional space by, in some embodiments, first applying the scattering operation to the extracted visual features to generate a second scattering vector in a second dimensional space. The second dimensional space may be of a higher dimensionality than the first dimensional space, for example. The second vector of scattering coefficients may be projected into the first dimensional space to generate the vector of scattering coefficients in the first dimensional space.

Some aspects described herein may provide one or more non-transitory computer readable media comprising instructions that, when executed by a processor, cause the processor to perform steps utilizing a scattering operation/transform to generate a prediction regarding the speech status of a subject. The processor may receive audiovisual input associated with a subject and extract a region-of-interest from a video component of the audiovisual input. The processor may normalize the region-of-interest to generate a normalized region-of-interest and may apply a scattering transformation to the normalized region-of-interest to generate a first vector of scattering coefficients. The processor may, in some embodiments, normalize the first vector of scattering coefficients to generate a first normalized vector of scattering coefficients. In some embodiments, however, the scattering coefficients may be used without being normalized. The processor may aggregate a plurality of normalized vectors of scattering coefficients including the first normalized vector of scattering coefficients to generate a set of aggregated visual feature vectors. The process may utilize the set of aggregated visual feature vectors as input to a first neural network for visual input processing and may generate a prediction regarding the speech status of the subject.

In some embodiments, the first vector of scattering coefficients may be in a first dimensional space. Applying a scattering transformation to the normalized region-of-interest to generate the first vector of scattering coefficients may comprise applying the scattering transformation to the normalized region-of-interest to generate a second vector of scattering coefficients in a second dimensional space and projecting the second vector of scattering coefficients into the first dimensional space to generate the first vector of scattering coefficients in the first dimensional space. The second dimensional space may be of a higher dimensionality than the first dimensional space.

Some aspects described herein may provide a system comprising a processor and memory configured to utilize a scattering transformation to generate scattering coefficients for a region-of-interested in a video component of audiovisual input associated with a subject. The scattering coefficients may be used as input to a neural network for visual processing to generate a prediction regarding the speech status of the subject. The system may be configured to receive audiovisual input associated with the subject and extract a region-of-interest from the video component of the audiovisual input. The system may apply a scattering transformation to the region-of-interest to generate a first vector of scattering coefficients. In some embodiments, the system may normalize the first vector of scattering coefficients to generate a first normalized vector of scattering coefficients. The system may aggregate a plurality of normalized vectors of scattering coefficients including the first normalized vector of scattering coefficients to generate a set of aggregated visual feature vectors, wherein the set of aggregated visual feature vectors may correspond to a plurality of sequential visual frames. The system may be configured to provide the set of aggregated visual feature vectors to a first neural network for visual input processing and generate a prediction regarding the speech status of the subject.

In some embodiments, the system may be configured to provide an audio component of the audiovisual input to a second neural network. The system may combine a first output of the first neural network with a second output of the second neural network to generate a fused audiovisual feature vector. The system may be configured to provide the fused audiovisual feature vector to a third neural network and generate a prediction regarding the speech status of the subject based on a third output of the third neural network and the fused audiovisual feature vector.

In some embodiments, the system may be configured to use an output of the first neural network based on the set of aggregated visual feature vectors to determine whether the subject is speaking. In some embodiments, the system may be configured to use an output of the first neural network based on the set of aggregated visual feature vectors to recognize speech content of the audiovisual input. In some embodiments, the system may be configured to use an output of the first neural network based on the set of aggregated visual feature vectors to distinguish between a foreground speaker and a background speaker.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
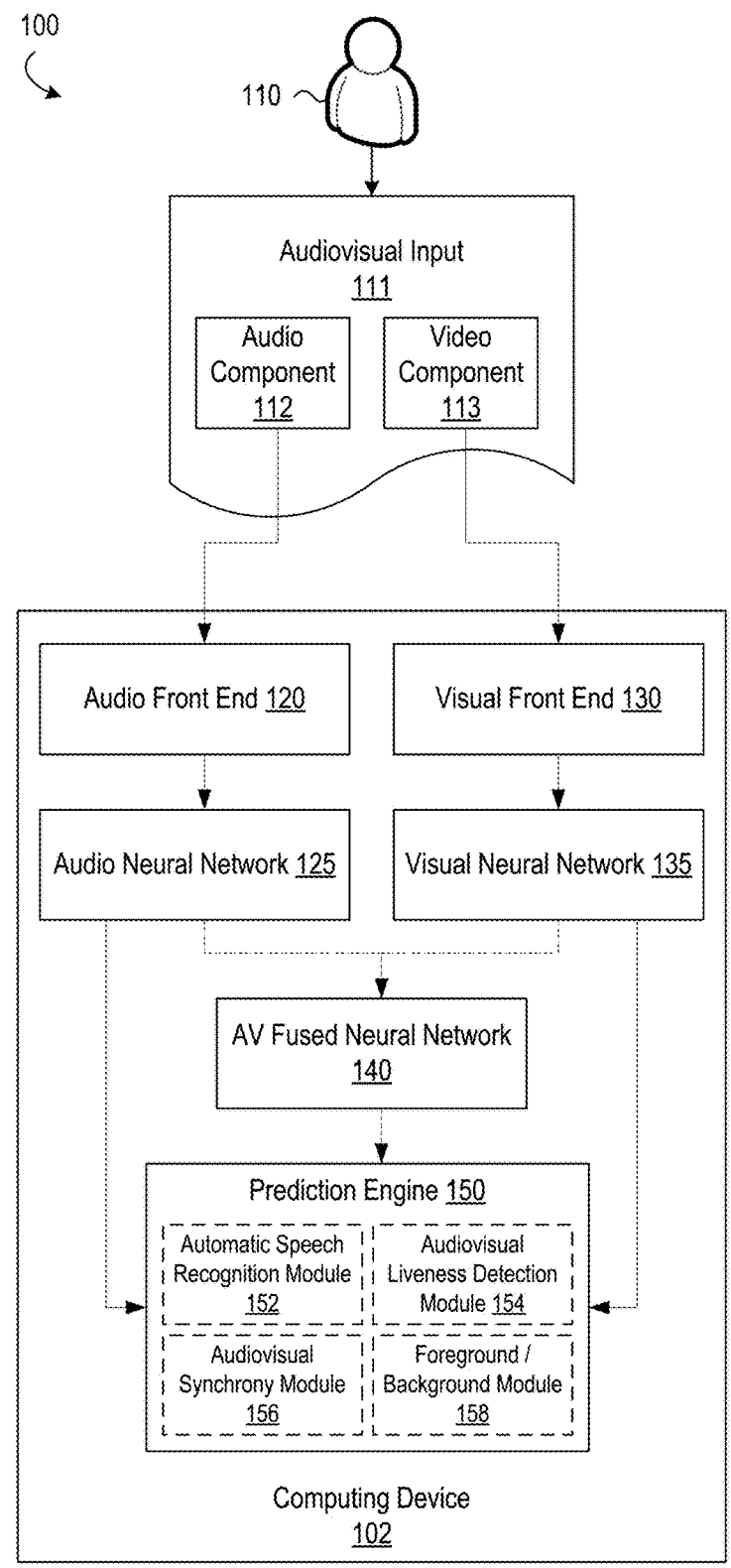
FIG. 1 depicts an example operating environment and computing device for implementation of a system for audiovisual speech recognition with scattering operations in accordance with illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed toward methods, computing devices, systems, and computer-readable media that apply scattering operations to extracted visual features of audiovisual input to generate predictions regarding the speech status of a subject. Visual scattering coefficients generated according to one or more aspects described herein may be used as input to a neural network operative to generate the predictions regarding the speech status of the subject. Predictions generated based on the visual features may be combined with predictions based on audio input associated with the visual features. In some embodiments, the extracted visual features may be combined with the audio input to generate a combined feature vector for use in generating predictions. Visual analysis utilizing scattering operations may be particularly robust to various imaging conditions of the subject, such as rotation, skew, deformation, and translation. Even if the subject is rotated in the frame or is looking down at the camera, visual analysis utilizing scattering according to one or more aspects described herein may return accurate results in an efficient manner.

The predictions generated by the system may be useful in recognizing various characteristics about the speech status of the subject. For example, the predictions may be used to assist in recognizing the content of speech associated with the subject (automatic speech recognition, or "ASR"), determining whether the subject is speaking ("AV-liveness" or "liveness"), determining whether speech originates from a foreground or background source (foreground/background detection), and/or determining whether an audio component and a video component of the audiovisual input are in-sync ("AV-synchrony"), for example.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a "set" as used in this description refers to a collection of one or more elements. Furthermore non-transitory computer-readable media refer to all types of computer-readable media with the sole exception being a transitory propagating signal.

FIG. 1 illustrates an example operating environment 100 in which one or more aspects described herein may be implemented. A computing device 102 may be configured to provide predictions regarding the speech status of a subject 110 captured by audio and/or visual capture devices associated with the computing device. The computing device may capture and/or receive audiovisual input 111 associated with the subject 110. For example, computing device 102 may utilize a microphone to capture audio commands from a subject 110, such as a user of the computing device, and a camera to capture video of the subject speaking the commands. The audiovisual input 111 may have an audio component 112 and a video component 113. According to some aspects described herein, computing device 102 may apply a scattering operation to features of video component 113 and provide the resulting scattering coefficients to a neural network for the generation of a prediction regarding the speech status of the subject.

Computing device 102 may be any suitable computing device for processing audiovisual input and generating a prediction regarding the speech status of a subject. For example, computing device 102 may incorporate a processor to execute instructions and memory storing instructions that, when executed by the processor, cause computing device 102 to perform steps in accordance with one or more aspects described herein. The computing device 102 at which the audio front end 120 and visual front end 130 reside may be one of many types of computing devices. Examples include desktop computing devices, laptop computing devices, tablet computing devices, palmtop computing devices, televisions, television set-top boxes, video game machines, electronic tools, electronic appliances, system and device controllers, and other types of computing devices that are controllable or otherwise operable based on natural language input received. As noted above, audiovisual speech recognition techniques using scattering operators as described herein may advantageously improve the accuracy of the final recognition results regarding a speech status of a subject as indicated in audiovisual input received at these computing devices. The computing device 102 having the audio front end 120 and the visual front end 130 may also be embedded into other systems. As one example, the computing device may be embedded into a vehicle system thus allowing a driver to issue commands to the vehicle and request input from the vehicle using natural language input such as speech. Additional examples will be appreciated with the benefit of this disclosure.

According to some aspects, the computing device 102 may process the audio and video components of the audiovisual input using parallel audio and visual pipelines. The audio pipeline may comprise the audio front end 120 and the audio neural network 125. The visual pipeline may comprise the visual front end 130 and the visual neural network 135. Output from the audio and visual pipelines may be fed into an audiovisual fused neural network 140 to generate a prediction regarding the speech status of the subject 110. A result from one or more of the neural networks 125, 135, and 140 may be used by a prediction engine 150 to generate determinations regarding automatic speech recognition through automatic speech recognition module 152, determinations regarding AV-liveness through audiovisual liveness detection module 154, determinations regarding AV-synchrony through audiovisual synchrony module 156, and/or foreground/background speaker detection through foreground/background module 158, for example.

The audiovisual input 111 may be processed by computing device 102 using audio front end 120 and/or visual front end 130. The processed audio component and video components may be passed to audio neural network 125 and/or visual neural network 135, respectively, and the computing device may generate a prediction regarding the speech status of the subject. In some embodiments, the neural network structures may be the same between the audio neural networks and the visual neural networks in terms of layer sizes and activation functions, differing primarily in the input features. Each layer of the network may be composed of one or more nodes, with each node taking a weighted sum of the inputs from the nodes in the previous layer. This weighted sum may be passed through a non-linear squashing function (such as a sigmoid) resulting in an output between 0 and 1, for example. The weights may or may not be shared between these nodes. This structure may be repeated in depth, until the sum is passed to an output layer such as, for example, a softmax layer producing posterior probabilities for the target classes.

The audio component 112 may be sampled at a first frequency, such as 100 Hz, and the video component 113 may be sample at a second frequency different from the first frequency, such as 30 Hz. The audio front end 120 and/or the visual front end 130 may be configured to aggregate a plurality of sequential samples/frames for analysis by the respective neural networks. The audio component 112 may be sampled at a first frequency, such as 100 Hz, and the video component 113 may be sample at a second frequency different from the first frequency, such as 30 Hz. In some embodiments, the audio front end 120 and/or the visual front end 130 may be configured to temporally interpolate a plurality of frames of the video component 113 to properly match up with a plurality of samples of the audio component 112 based on timestamps and/or determined speech status of the frames/samples.

The audio component 112 may be processed by the audio front end 120 to extract audio features of the audiovisual input 111, as described further herein. For example, the audio front end 120 may extract a set of Mel frequency cepstral coefficients (MFCCs) from the audio component 112. As other examples, the audio front end 120 may determine linear prediction coefficients (LPCs), linear prediction cepstral coefficients (LPCCs), and/or any other suitable audio features for each frame of audio processed in the audio processing pipeline. The audio front end 120 may be configured to normalize the extracted audio features to generate a normalized audio feature vector. The audio front end 120 may aggregate the normalized audio feature vectors for a plurality of sequential samples together to form a set of normalized audio feature vectors over a period of time, in some embodiments. The audio front end 120 may provide the normalized audio feature vector and/or the aggregated set of normalized audio feature vectors to the audio neural network 125 for processing and generation of a prediction regarding the speech status of the subject 110. In some embodiments, audio neural network 125 may comprise a software classifier trained to generate predictions regarding the speech status of a subject based on one or more input audio features. Audio neural network 125 may be trained using a known corpus of audio samples with associated speech statuses and may employ one or more models associating audio features to various speech statuses. The computing device may use a result from the audio neural network 125 to generate a prediction regarding the speech status of the subject 111 using prediction engine 150 and/or as further input to an audiovisual fused neural network 140.

The video component 113 may be processed by the visual front end 130 to extract visual features of the audiovisual input 111, as described further herein. In some embodiments, the visual front end 130 may extract a region of interest from the video component for further processing. For example, the visual front end 130 may utilize face detection and/or detect a mouth region of the subject 111 as captured in the video component and may extract image data corresponding to the mouth region. In one implementation, for example, the visual front end 130 may extract a region of interest having a size of 64×64 pixels.

The extracted visual features may be used as input to an image classifier such as visual neural network 135. In the area of image classification, it may be advantageous for signal representations to be invariant with respect to the transformations which do not affect our ability to recognize the content including in the signal representations. These transformations may include physical transformations, such as translations, dilations or rotations. Besides invariance, it may be advantageous for signal representations to also be continuous with respect to signal deformations and capture enough signal information so that analysis may be able to discriminate between different signal classes. In video processing, applications may encounter considerable intra-class variability due to translations, rotations, scaling, and deformations usually resulting from camera positioning and stability. For example when capturing the user with a smartphone camera which is held below the user's chin, this pose may result in a stretching of the user's face (relative to a straight-on view). The effectiveness of a signal representation for use in general audiovisual speech recognition tasks may depend upon the signal representation's capacity to reduce this intra-class variability while keeping enough signal information to discriminate between different object classes. According to some aspects described herein, object classes used in audiovisual speech recognition tasks may relate to context dependent phonemes, foreground/background speaker segmentation, and/or audiovisual liveness measured as a level of audiovisual asynchrony. For example, one set of classes used by an image classifier may correspond to the duration of asynchrony found between the audio and visual channels of audiovisual input.

Thus, the visual front end 130 may apply a scattering operator and/or scattering transform to the extracted visual features to generate a vector of scattering coefficients, as discussed further herein. A scattering transform builds invariant, stable and informative signal representations for classification. It is computed by scattering the signal information along multiple paths, with a cascade of wavelet modulus operators implemented in a deep convolutional network. It is stable to deformations, which makes it particularly effective for image, audio and texture discrimination. Scattering operators have been recently developed to assist in classifying features in certain limited applications, such as handwriting analysis. A scattering transform may define a signal representation in a manner which is invariant to translations and Lipschitz continuous relative to deformations. Through use of a scattering transform, complex classes of signals and textures can be modeled with low-dimensional affine spaces in the scattering domain. Additional details regarding scattering operators and scattering transforms are provided in J. Bruna and S. Mallat, "Classification with Scattering Operators," 17 pages, IEEE CVPR, June 2011, the entirety of which is incorporated herein by reference.

In applying the scattering operators and/or scattering transform, visual features extracted from a video component of the audiovisual input may be represented in a convolutional network using a signal representation comprised of one or more wavelets. Convolutional networks may be general computational architectures that involve convolutions and non-linear operators. A wavelet is a localized waveform and is thus stable to deformations. The wavelet representation may be generated by applying a wavelet kernel (for example the Gabor wavelet) and dilating a wavelet at desired (tuned) resolution, which may then capture the deformations. For example, the wavelet transform may be defined as the convolution between the signal and the scaled/rotated wavelet kernel, as shown below:

$$x(t) * \psi_\lambda(t) = \int x(u) \psi_\lambda(t-u) du$$

Wherein t corresponds to time, x(t) corresponds to the input signal, $\psi_\lambda(t)$ corresponds to the wavelet kernel function the signal is passed through, and u corresponds to the integration variable used to produce the filtered response.

However, this wavelet transform may not be stable to translations. To achieve translation invariance, a modulus operator may be applied along to the wavelet along with an averaging operation, as shown below:

$$\int \||x * \psi_\lambda\|\|(u) du$$

Wherein x corresponds to the input signal and $\psi_\lambda$ corresponds to the wavelet kernel function the signal is passed through. Translation invariance may be obtained by progressively mapping high frequency wavelet coefficients to lower frequencies using the modulus operator. The signal itself may be reconstructed with diminishing loss with deeper iterations of this modulus operation. Wavelet scattering may be performed in a deep convolutional network which cascades wavelet transforms and modulus operators. As opposed to generic convolutional networks, a deep convolutional network used for scattering generates coefficients at each layer rather than just at the last layer. The energy of the deepest layer converges quickly to zero. Furthermore, filters in the deep convolutional network used for scattering are derived from predefined wavelets rather than learned from data.

The scattering operators and/or scattering transform may provide advantages over alternative techniques that utilize a two dimensional discrete cosine transform (2D DCT) in analysis of extracted visual features. The 2D DCT is a type of signal representation that is translation invariant when a modulus operator is applied. Using the 2D DCT, a translation in time or space shows up as a change in phase when a modulus operator is applied, rendering the representation translation invariant. The 2D DCT alternative may also be stable to small additive noises, but it is not stable to deformations which are prevalent in video capture. Ad-hoc approaches attempt to achieve stability to deformations in the 2D DCT may involve averaging across local frequencies, but this averaging will lose information about the signal. Thus, the use of scattering operators and/or a scattering transform may provide enhanced results in classifying the visual features of the subject.

The visual front end 130 may generate a vector of scattering coefficients for the extracted visual features as described above. The visual front end 130 may be configured to normalize the vector of scattering coefficients to generate a normalized vector of scattering coefficients. The video front end 130 may aggregate the normalized vectors of scattering coefficients for a plurality of sequential frames together to form a set of normalized vectors of scattering coefficients over a period of time, in some embodiments. The visual front end 130 may provide the normalized vector of scattering coefficients and/or the aggregated set of vectors of scattering coefficients to the visual neural network 135 for processing and generation of a prediction regarding the speech status of the subject 110. In some embodiments, visual neural network 135 may comprise a software classifier trained to generate predictions regarding the speech status of a subject based on one or more input visual features. In particular, according to some aspects described herein, visual neural network 135 may be adapted to generate a prediction regarding the speech status of the subject based on a vector and/or set of vectors of scattering coefficients associated with the visual features.

In some embodiments, the output of the audio neural network 125 and/or the visual neural network 135 may be provided to an audiovisual fused neural network 140. The computing device 102 may combine the output of the audio neural network 125 with the output of the visual neural network 135 and provide the combined output to the audiovisual fused neural network. In other embodiments, the computing device 102 may combine the extracted features of the video component with the extracted features of the audio component and provide the combined features to the audiovisual fused neural network 140 directly from the audio front end 120 and visual front end 130, bypassing the audio neural network 125 and the visual neural network 135. The audiovisual fused neural network 140 may generate a prediction regarding the speech status of the subject 110 based on the fused audiovisual feature vector.

In some embodiments, the computing device 102, audio front end 120, and/or visual front end 130 may temporally interpolate the audio component 112 and/or the video component 113 of the audiovisual input 111 to determine a sequence of video frames corresponding to a particular sequence of audio samples. The correspondence between the sequence of video frames and the sequence of audio samples may be used to combine the audio features and the video features to generate a combined feature vector for input to the audiovisual neural network 140. In some embodiments, the video component may be captured at a first frequency/frame rate and the audio component may be captured at a second frequency different from the first frequency. As noted above, in one implementation the video may be captured at 30 frames per second while the audio is sampled at 100 samples per second. In some embodiments, the computing device 102 may determine a correspondence between the sequence of video frames and the particular sequence of audio samples based on timestamp information. In other embodiments, the computing device 102 may determine a correspondence between the sequences based on determining one or more features contained therein and matching a feature in the video component with a corresponding feature in the audio component. For example, the computing device 102 may detect that the subject mouths the letter 'o' at a first time and that the audio contains the sound for the letter 'o' at a second time, and may determine that the first time in the video component corresponds to the second time in the audio component.

A result from one or more of the neural networks 125, 135, and 140 may be used by a prediction engine 150 to generate determinations regarding automatic speech recognition through automatic speech recognition module 152, determinations regarding AV-liveness through audiovisual liveness detection module 154, determinations regarding AV-synchrony through audiovisual synchrony module 156, and/or foreground/background speaker detection through foreground/background module 158, for example.

Figure 2A:
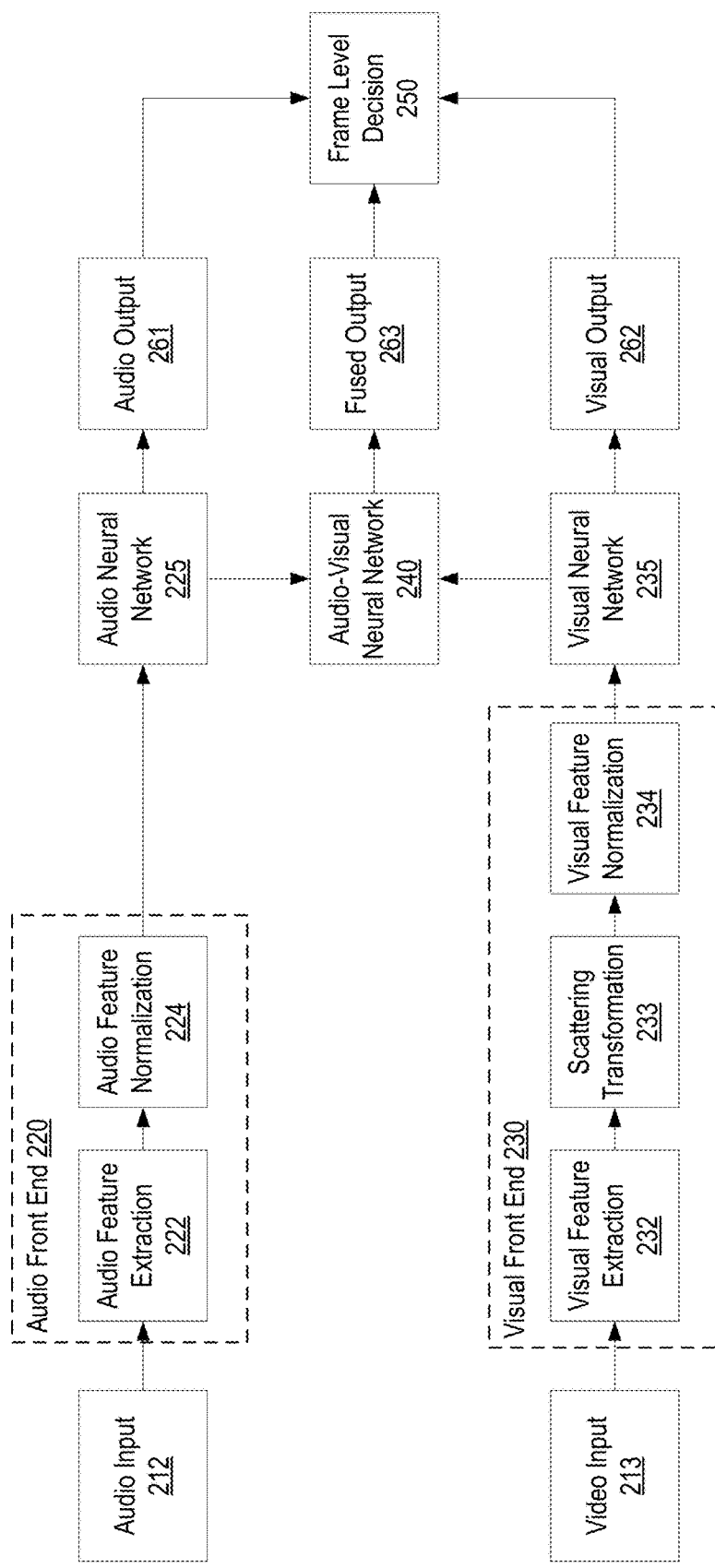
FIGS. 2A-2B depict example data flows for generating predictions regarding the speech status of a subject in accordance with one or more aspects described herein.
Figure 2B:
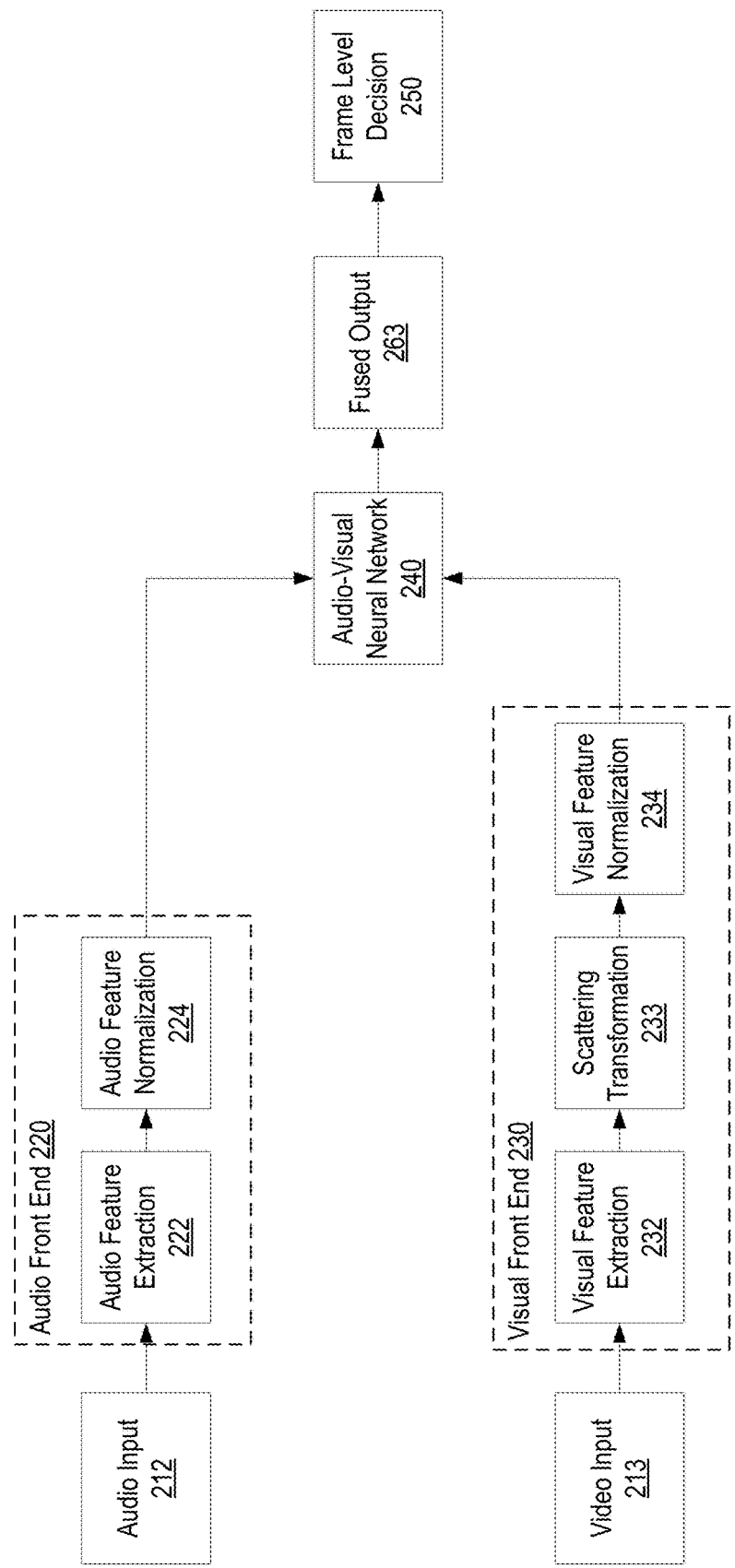

Having described an exemplary operating environment and computing device for implementing automatic speech recognition using scattering operators according to one or more aspects herein, discussion will now focus on the audio and visual pipelines and a data flow thereon as illustrated in FIGS. 2A and 2B.

FIG. 2A illustrates a data flow according to an audio pipeline (comprising audio feature extraction 222, audio feature normalization 224, and/or audio neural network 225) and a video pipeline (comprising visual feature extraction 232, scattering transformation 233, visual feature normalization 234, and/or visual neural network 235) for performing audiovisual speech recognition using visual scattering operators. The data flow illustrated in FIG. 2A may be implemented using any suitable computing device, such as computing device 102 of FIG. 1.

According to some aspects described herein, a computing device may receive audiovisual data/input comprising an audio component and a video component, as described above with regard to FIG. 1. The audiovisual data, audio component, and/or video component may be processed using one or more neural networks to generate a prediction regarding the speech status of a subject (for example, to determine whether the received audio comprises speech from a particular context dependent phoneme). The data flow of FIG. 2A illustrates an audio processing pipeline and a visual processing pipeline operating in parallel. Processing in the two pipelines may operate at the same or different rates, and aspects of the disclosure are not limited in this respect. In some embodiments discussed in more detail below, processing in the audio processing pipeline may occur at a rate of 100 audio frames per second, whereas processing in the video processing pipeline may occur at a rate of 30 video frames per second. Processing in the audio processing pipeline and the video processing pipeline, in accordance with some embodiments, is discussed in further detail below.

In element 212 of the data flow, audio may be received (e.g., by a microphone) by the computing device. The received audio may be converted into a digital representation by sampling the audio at a particular sampling rate (e.g., 16 kHz) and dividing the sampled audio into audio frames (e.g., 25 ms frames). Frames of the sampled audio may then be processed in act 222 by an audio front end 220, which may correspond to the audio front end 120 of FIG. 1, to determine audio features for the frame which characterize the spectral content of the speech in the frame. Any suitable audio features useful for automatic speech recognition may be determined for frames of the sampled audio data. For example, in some embodiments a plurality of Mel-frequency cepstral coefficients (MFCCs) are determined for each frame of audio input. Alternatively, Linear prediction coefficients (LPCs), linear prediction cepstral coefficients (LPCCs) or any other suitable audio features may be determined for each frame of audio processed in the audio processing pipeline.

The audio processing pipeline then proceeds to element 224, where the audio front end 220 may normalize the audio features for each audio frame. Any suitable normalization technique, examples of which are known in the art, may be used. For example, in some embodiments an energy measure is determined for each frame, and determined energy measure may be used for normalization. The process then proceeds to element 225, where one or more frames of features are provided as input to an audio neural network. In some embodiments, audio features for nine frames of input audio (e.g., with each frame having 24 MFCCs) are combined into one feature vector, which is provided as input to the audio neural network. The process then proceeds to element 261, where audio information is output from the audio neural network. In accordance with the techniques described herein, output from the audio neural network may also be provided to an audio-visual neural network 240. The audio-visual neural network may be configured to combine audio and visual features to generate an audio-visual fused output, as discussed in more detail with regard to FIG. 1, above.

The video processing pipeline of FIG. 2A includes element 213, where video may be received (e.g., by a camera) and sampled at a particular frame rate (e.g., 30 Hz) to produce a digital video signal. In element 232, at least some information in frames of the sampled video may then be processed to determine visual features characterizing the spatial spectral energy for at least a portion of the frame of video. In some embodiments, face detection and/or region of interest techniques are used to identify a portion of an image (e.g., all or a portion of a face in the image) from which visual features are to be determined. For example, a portion of the image in a frame corresponding to the lips of the speaker may be selected as a region of interest, and visual features for this region of interest may be determined. The computing device may extract any suitable visual features useful for determining whether the received audio comprises speech from particular context dependent phonemes (in AV-ASR applications), for example. In this embodiment, the image for a frame of video data may be analyzed and a 64×64 pixel region of interest including the mouth of a speaker in the image may be identified.

In element 233 of the data flow, at least a portion of the data in the region of interest may be processed to determine a vector of visual scattering features computed as the modulus of the wavelet transform, as described above with respect to FIG. 1, characterizing the spatial spectral energy projected on scaled and rotated wavelet kernels $\psi_\lambda$ for at least a portion of the frame of video. This vector of visual scattering features which are in a high dimensional space (6400 dimensions, in one implementation) may then be projected to a lower dimensional space (60 dimensions for example) in such a way to assist in the discrimination of the audio context dependent phonemes (in the example of AV-ASR applications). The data flow then proceeds to element 234, where the determined visual features and/or scattering coefficients are normalized, for example, based on an energy measure in each frame of features, or using any other suitable normalization technique. The data flow then proceeds to element 235, where one or more frames of visual features are provided as input to a visual neural network. In some embodiments, visual features for fifteen frames of input video are combined into one feature vector, which is provided as input to the visual neural network in element 235. The data flow then proceeds to element 262, where visual information is output from the visual neural network. In accordance with the techniques described herein, output from the visual neural network may also be provided to an audio-visual neural network 240, which combines audio and visual features to generate an audio-visual fused output 263, as discussed in more detail above with respect to FIG. 1, and below.

As shown in FIG. 2A, information output from the audio neural network 225 and the visual neural network 235 may be used to form a fused feature space that is input (e.g., as input target posteriors) to audio-visual neural network 240. In element 263, information (e.g., output target posteriors) from the audio-visual neural network is output. As shown, the output target posteriors from the audio neural network, the visual neural network, and the audio-visual neural network may be decision fused in element 250 of the data flow, such as by prediction engine 150 of FIG. 1, to produce a frame-level (or multi-frame level) decision of whether a segment of audio comprises speech from a particular context dependent phoneme (in the example of an AV-ASR application). As described above, the frame level decision may be used to make determinations regarding automatic speech recognition, AV-liveness, AV-synchrony, and/or foreground/background speaker detection, for example.

FIG. 2B illustrates an alternative data flow according to an audio pipeline (comprising audio feature extraction 222, audio feature normalization 224, and/or audio neural network 225) and a video pipeline (comprising visual feature extraction 232, scattering transformation 233, visual feature normalization 234, and/or visual neural network 235) for performing audiovisual speech recognition using visual scattering operators. The data flow illustrated in FIG. 2B may be implemented using any suitable computing device, such as computing device 102 of FIG. 1. Generally, the data flow illustrated in FIG. 2B is very similar to that illustrated in FIG. 2A. Unlike the audiovisual processing data flow illustrated in FIG. 2A, however, the data flow illustrated in FIG. 2B utilizes a single combined audiovisual neural network.

In the alternative configuration illustrated in FIG. 2B, the audio front end 220 extracts and normalizes audio features from an audio component of received audiovisual input. The visual front end 230 extracts visual features from a video component of the received audiovisual input, applies a scattering transform to the extracted visual features to generate a scattering feature vector comprising visual scattering coefficients, and normalizes the scattering feature vector. The normalized audio features and the normalized vector of visual scattering coefficients may be combined and provided to audio visual neural network 240. As described above with respect to FIG. 1, in some embodiments, the computing device may temporally interpolate the audio component and/or the video component of the audiovisual input to determine a sequence of video frames corresponding to a particular sequence of audio samples. The correspondence between the sequence of video frames and the sequence of audio samples may be used to combine the audio features and the video features to generate a combined feature vector for input to the audiovisual neural network.

Figure 3:
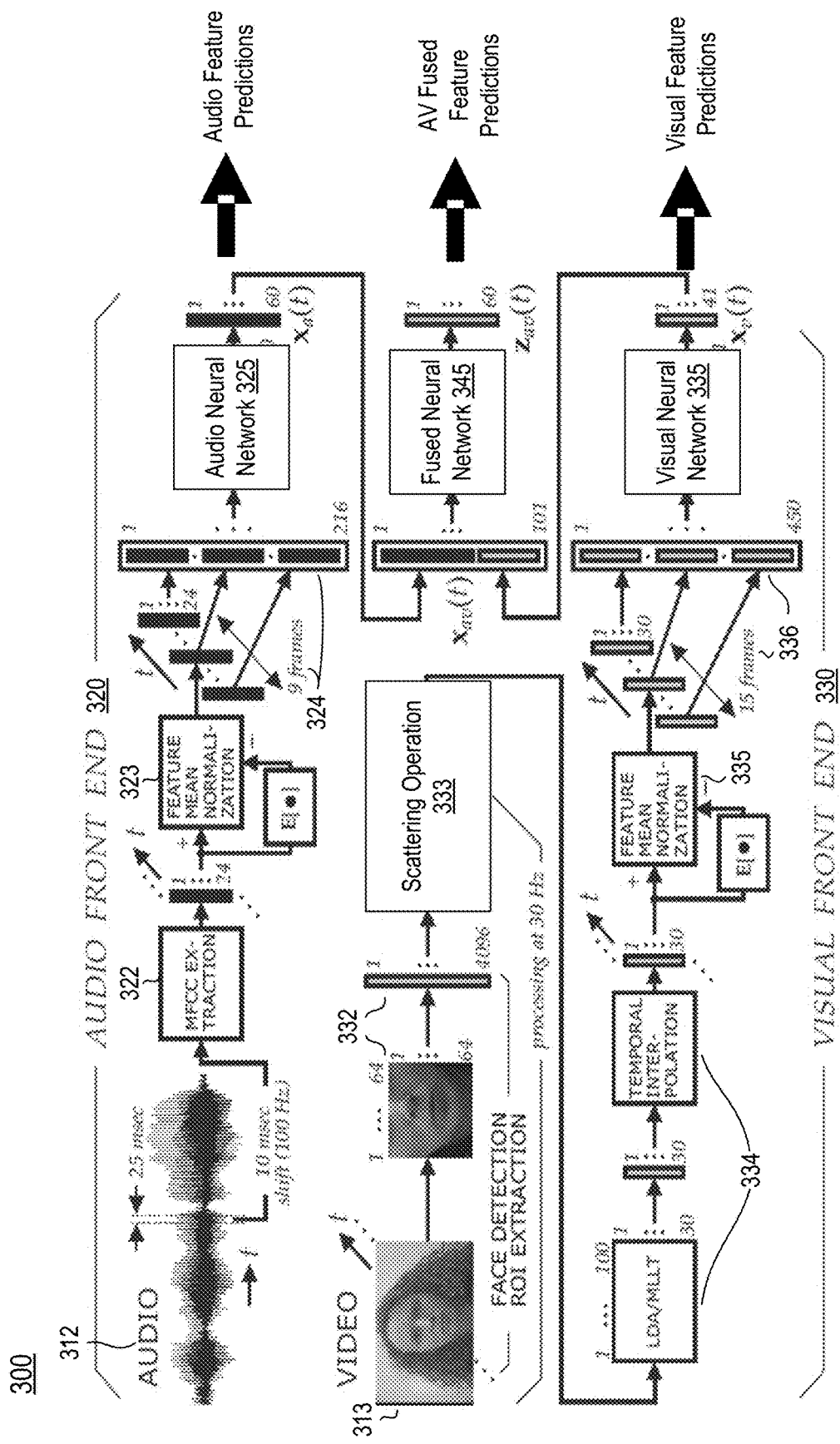
FIG. 3 depicts an example implementation of one or more aspects of the data flow depicted in FIG. 2A, in accordance with one or more aspects described herein.

Having discussed example data flows according to one or more aspects described herein and illustrated in FIGS. 2A and 2B, discussion will now turn to FIG. 3 which depicts a sample implementation of the data flow illustrated in FIG. 2A.

Audiovisual (AV) speech recognition system 300 may utilize an audio front end 320 and a visual front end 330 to generate predictions regarding the speech status of a subject. AV speech recognition system 300 may be implemented using any suitable computing device, such as computing device 102 of FIG. 1. The audiovisual input received by the AV speech recognition system 300 may include a subject on camera speaking and the associated audio track. The audiovisual input may include time synchronized video and audio channels/streams.

An audio component 312 of audiovisual input may be received by the AV speech recognition system 300 having a sampling rate of 100 audio frames per second, for example. The audio component 312 may be processed by audio front end 320 to extract features and properly format them for use in one or more neural networks. The audio front end 320 may extract features from individual frames in element 322 by, for example, extracting a set of MFCCs for the audio frame (having, for example, a dimensionality of 24). The AV speech recognition system may normalize the extracted features in element 323 (such as by using feature mean normalization, a long term average) and aggregate a plurality of sequential frames in element 324 to generate an aggregated set of audio features for the plurality of sequential frames having 216 dimensions. The plurality of frames may be combined and/or stacked over time. The AV speech recognition system may rotate the dimensions of the extracted features using a Linear Discriminant Analysis (LDA) operation and/or a Maximum Likelihood Linear Transform (MLLT), for example rotating the dimensions of the audio feature vector from 216 to 60. The aggregated set of audio features may be provided to an audio neural network 325 for generation of output useful to determine a speech status of a subject of the audiovisual input.

A video component 313 of the audiovisual input may be received by the AV speech recognition system 300 having a sampling rate of 30 frames per second, for example. The video component 313 may be processed by video front end 330 to extract features and properly format them for use in one or more neural networks. The video front end 330 may extract features from individual frames in element 332 by, for example, identifying a region-of-interest in the video component and extracting the region of interest. In some implementations, the visual front end 330 may extract the region surrounding the lips of the subject in the video component. In an example implementation, the region of interest may be a 64×64 pixel region and may be flattened to 4096 dimensions. The video front end 330 may then apply a scattering operation 333 to the extracted video features to generate a vector of scattering coefficients associated with the extracted visual features. In element 334, the AV speech recognition system 300 may utilize additional processing to further format the normalized vectors of visual scattering features, such as by employing LDA/MLLT as described previously and/or by interpolating a correlation between the video component (sampled at 30 fps, for example) and the audio component (sampled at 100 fps, for example). In element 335, the AV speech recognition system 300 may normalize the extracted visual speech scattering coefficient vector and may aggregate the feature vectors for a plurality of sequential frames. In an example implementation, each video frame may be processed to generate 30 scattering coefficients and the system may aggregate 15 frames to generate an aggregated scattering coefficients vector having 450 dimensions. The aggregated set of scattering coefficients may be provided to the visual neural network 335 for generation of output useful to determine a speech status of a subject of the audiovisual input.

The output of the audio neural network 325 may be generated with 60 dimensions, while the output of the visual neural network 335 may be generated with 41 dimensions, in a sample implementation. The system may combine the output of the audio neural network 325 and the output of the visual neural network 335 to generate a fused audiovisual feature vector for processing by the fused neural network 345. The combined output may have 101 dimensions, in a sample implementation.

As shown, the output target posteriors from the audio neural network, the visual neural network, and the audiovisual neural network may be decision fused to produce a frame-level (and/or multi-frame level) decision of whether a segment of audio comprises speech from a particular context dependent phoneme (in the example of an AV-ASR application). As described above, the frame level decision may be used to make determinations regarding automatic speech recognition, AV-liveness, AV-synchrony, and/or foreground/background speaker detection, for example.

Figure 4:
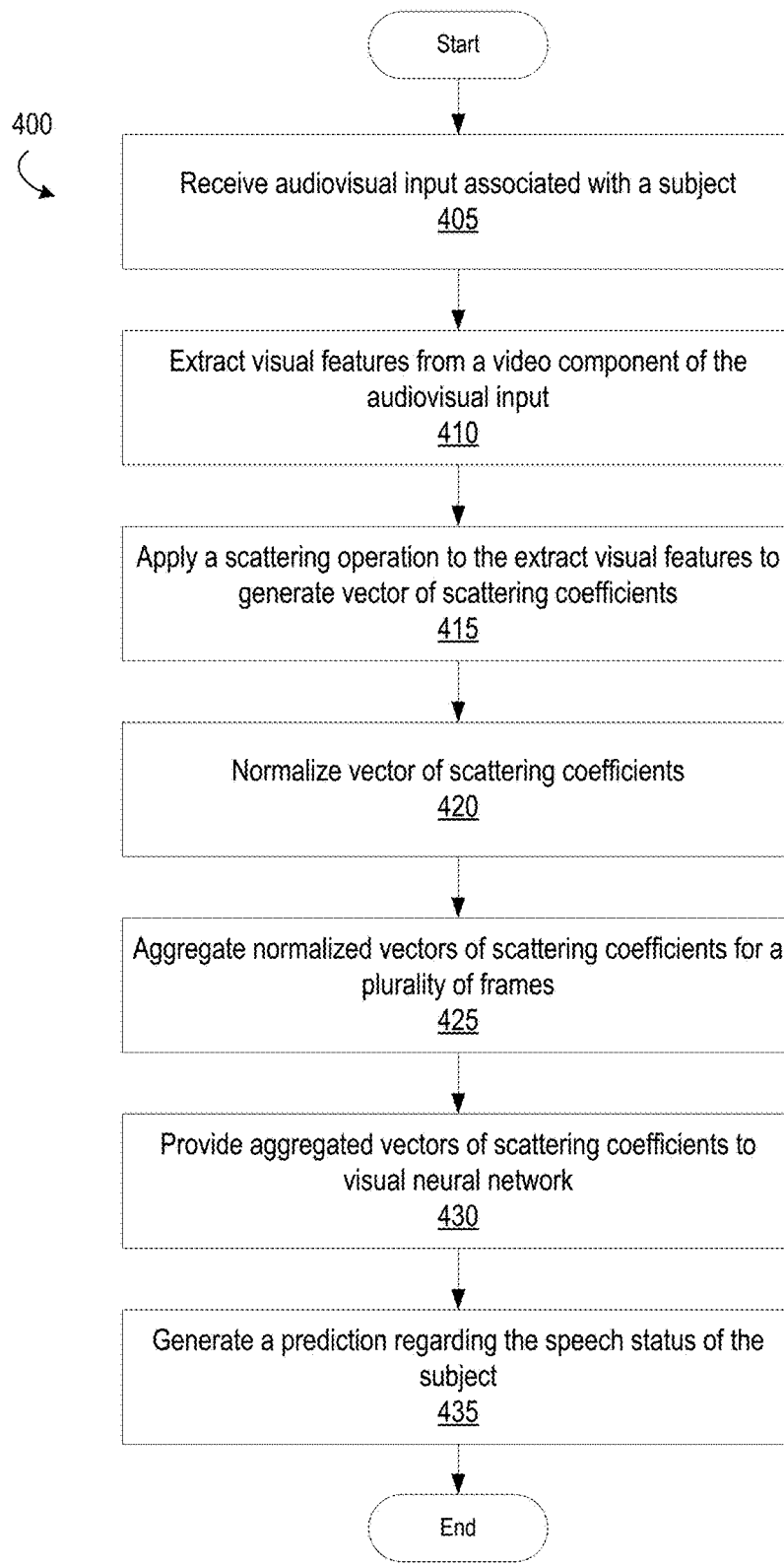
FIG. 4 depicts a first example process flow for an enhanced method of audiovisual speech recognition with scattering operations in according with one or more aspects described herein.
Figure 5:
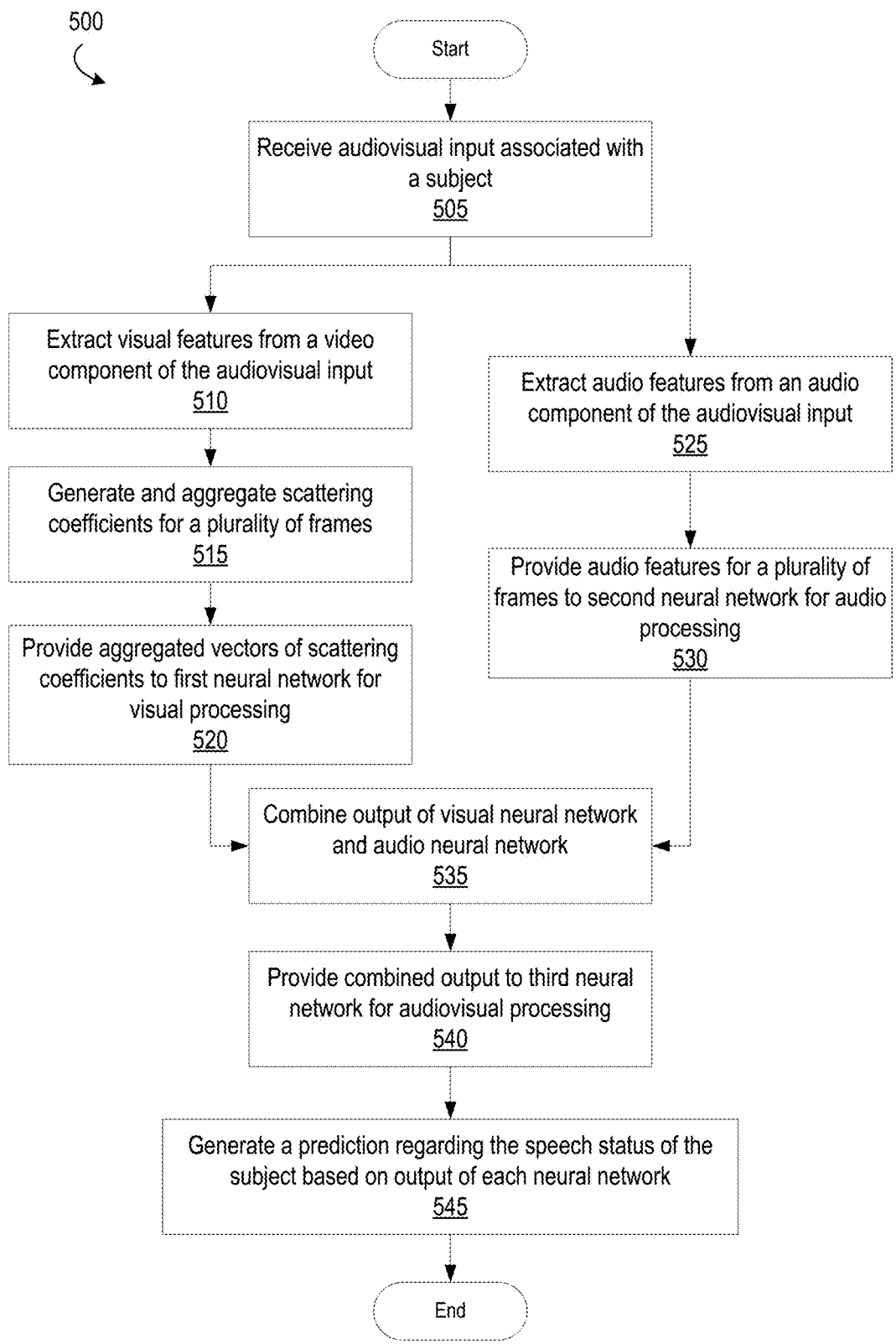
FIG. 5 depicts a second example process flow for an enhanced method of audiovisual speech recognition with scattering operations in according with one or more aspects described herein.

Having discussed an example implementation of the data flow as illustrated in FIG. 3, discussion will now turn to example methods of audiovisual speech recognition using scattering operators to analyze visual features as illustrated in FIGS. 4 and 5, according to some aspects described herein.

FIG. 4 illustrates a method 400 for generating a prediction regarding the speech status of a subject based on a video component of audiovisual input associated with the subject. The method 400 may be implemented by any suitable computing device, such as computing device 102 of FIG. 1, and/or in any suitable operating environment, such as operating environment 100 of FIG. 1. Although a number of steps are illustrated in FIG. 4, some embodiments may omit one or more steps and/or perform the steps in a different order.

At step 405, the computing device may receive audiovisual input associated with the subject. As described above, the audiovisual input may comprise an audio component and a visual component and may include audio samples of the subject speaking and video image data of the subject corresponding to the audio samples.

At step 410, the computing device may extract one or more visual features from the video component of the audiovisual input. As described above, the computing device may identify a region of interest in the video component such as a lip region associated with the subject. The computing device may make use of face and/or mouth recognition algorithms to identify the region of interest.

At step 415, the computing device may apply a scattering transform/operation to the extracted visual features. The scattering transform/operation may involve the iterative application of scattering operators to a wavelet representation of the extracted visual features, for example. Details of the scattering transform are provided above with respect to FIGS. 1 and 2A.

At step 420, the computing device may normalize the vector of scattering coefficients to generate a normalized vector of scattering coefficients, as also discussed further above with respect to FIG. 1.

At step 425, the computing device may aggregate the normalized vectors of scattering coefficients for a plurality of sequential video frames, as also discussed further above with respect to FIG. 1.

At step 430, the computing device may provide the aggregated vectors of scattering coefficients to a visual neural network configured to process one or more visual features to generate a prediction regarding the speech status of the subject. In particular, the visual neural network may be configured to process the vectors of scattering coefficients generated from the visual features, as described above with respect to FIG. 1.

At step 435, the computing device may generate a prediction regarding the speech status of the subject. As described above, the prediction may be used to make determinations regarding automatic speech recognition, AV-liveness, AV-synchrony, and/or foreground/background speaker detection, for example. The prediction may be used as input to another neural network configured to process a combined and/or fused representation of the audio component and the video component of the audiovisual input, as further described above as well as below with respect to FIG. 5.

FIG. 5 illustrates a method 500 for generating a prediction regarding the speech status of a subject based on both an audio component and a video component of audiovisual input associated with the subject. The method 500 may be implemented by any suitable computing device, such as computing device 102 of FIG. 1, and/or in any suitable operating environment, such as operating environment 100 of FIG. 1. Although a number of steps are illustrated in FIG. 5, some embodiments may omit one or more steps and/or perform the steps in a different order.

At step 505, the computing device may receive audiovisual input associated with the subject. As described above, the audiovisual input may comprise an audio component and a visual component and may include audio samples of the subject speaking and video image data of the subject corresponding to the audio samples.

Steps 510-520 may proceed according to the steps described above with regard to FIG. 4. At step 510, the computing device may extract visual features from the video component of the audiovisual input. At step 515, the computing device may generate and aggregate scattering coefficients for a plurality of frames. At step 520, the computing device may provide aggregated vectors of scattering coefficients to a first neural network for visual processing.

At step 525, which may be performed in parallel to steps 510-520, the computing device may extract one or more audio features from the audio component of the audiovisual input. For example, the computing device may extract a set of MFCCs characterizing the audio characteristics of the audio component.

At step 530, the computing device may provide the extracted audio features to a second neural network for audio processing. The computing device may aggregate extracted audio features for a plurality of sequential audio frames and provide the aggregated audio features to the second neural network for audio processing.

At step 535, the computing device may combine the output from the first neural network for visual processing with the output from the second neural network for audio processing to generate a combined output of audio and visual features. In some embodiments, the combining may include temporally interpolating the video component and/or the audio component to determine a correspondence between a set of sequential video frames and an associated set of sequential audio frames, as described above with regard to FIGS. 1 and 2A.

At step 540, the computing device may provide the combined output to a third neural network for audiovisual processing. The third neural network may be configured to process the combined representation of the features of the audio and video components to generate a prediction regarding the speech status of the subject. At step 545, the computing device may use the third neural network for audiovisual processing to generate a prediction regarding the speech status of the subject based on the combined representation of the audio component and the video component, as described further above with regard to FIGS. 1 and 2A. As described above, the prediction may be used to make determinations regarding automatic speech recognition, AV-liveness, AV-synchrony, and/or foreground/background speaker detection, for example.

In some embodiments, the computing device may omit steps 520 and 530 and instead combine the aggregated visual scattering coefficients with the extracted audio features. The combined visual scattering coefficients and audio features may be provided directly to the third neural network for audiovisual processing, bypassing the first neural network for visual processing and the second neural network for audio processing. An example of such a method is illustrated in FIG. 6.

Figure 6:
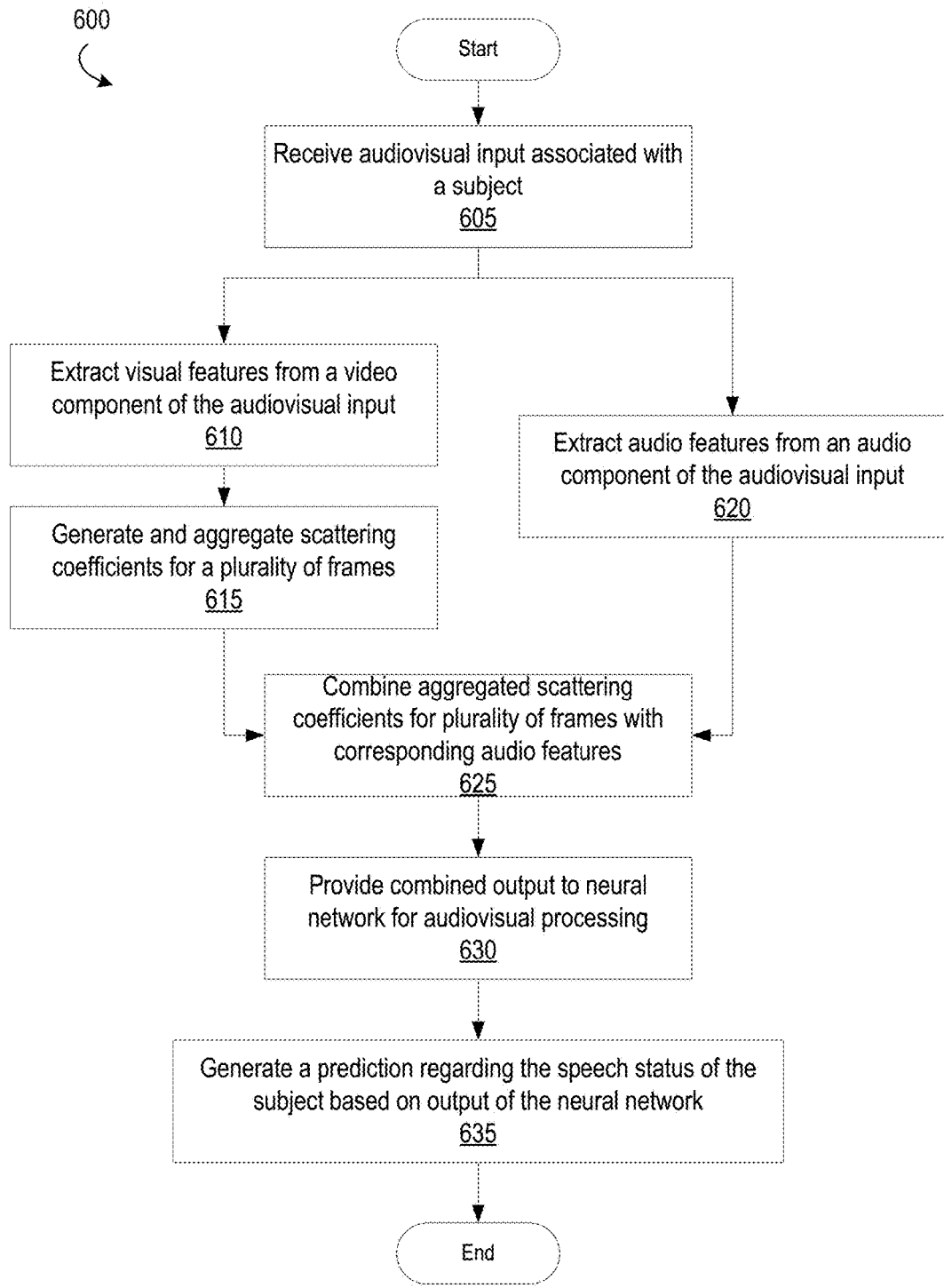
FIG. 6 depicts a third example process flow for an enhanced method of audiovisual speech recognition with scattering operations in according with one or more aspects described herein.

FIG. 6 illustrates a method 600 for generating a prediction regarding the speech status of a subject based on both an audio component and a video component of audiovisual input associated with the subject. The method 600 may be implemented by any suitable computing device, such as computing device 102 of FIG. 1, and/or in any suitable operating environment, such as operating environment 100 of FIG. 1. Although a number of steps are illustrated in FIG. 6, some embodiments may omit one or more steps and/or perform the steps in a different order.

Steps 605, 610, 615, and 620 may generally correspond to steps 505, 510, 515, and 525 as illustrated in FIG. 5. At step 605, the computing device may receive audiovisual input associated with a subject. At step 610, the computing device may extract visual features from a video component of the audiovisual input. At step 615, the computing device may generate and aggregate scattering coefficients for a plurality of sequential video frames. At step 620, which may be performed in parallel with steps 610-615, the computing device may extract audio features from an audio component of the audiovisual input.

At step 625, the computing device may combine the aggregated visual scattering coefficients with the extracted audio features. In some embodiments, the combining may include temporally interpolating the video component and/or the audio component to determine a correspondence between a set of sequential video frames and an associated set of sequential audio frames, as described above with regard to FIGS. 1 and 2A.

At step 630, the combined visual scattering coefficients and audio features may be provided to a neural network for audiovisual processing, without using a separate neural network to preprocess the scattering coefficients or the audio features. The neural network may be configured to process the combined representation of the features of the audio and video components to generate a prediction regarding the speech status of the subject.

At step 635, the computing device may use the neural network for audiovisual processing to generate a prediction regarding the speech status of the subject based on the combined representation of the audio component and the video component, as described further above with regard to FIGS. 1 and 2A. As described above, the prediction may be used to make determinations regarding automatic speech recognition, AV-liveness, AV-synchrony, and/or foreground/background speaker detection, for example.

Figure 7:
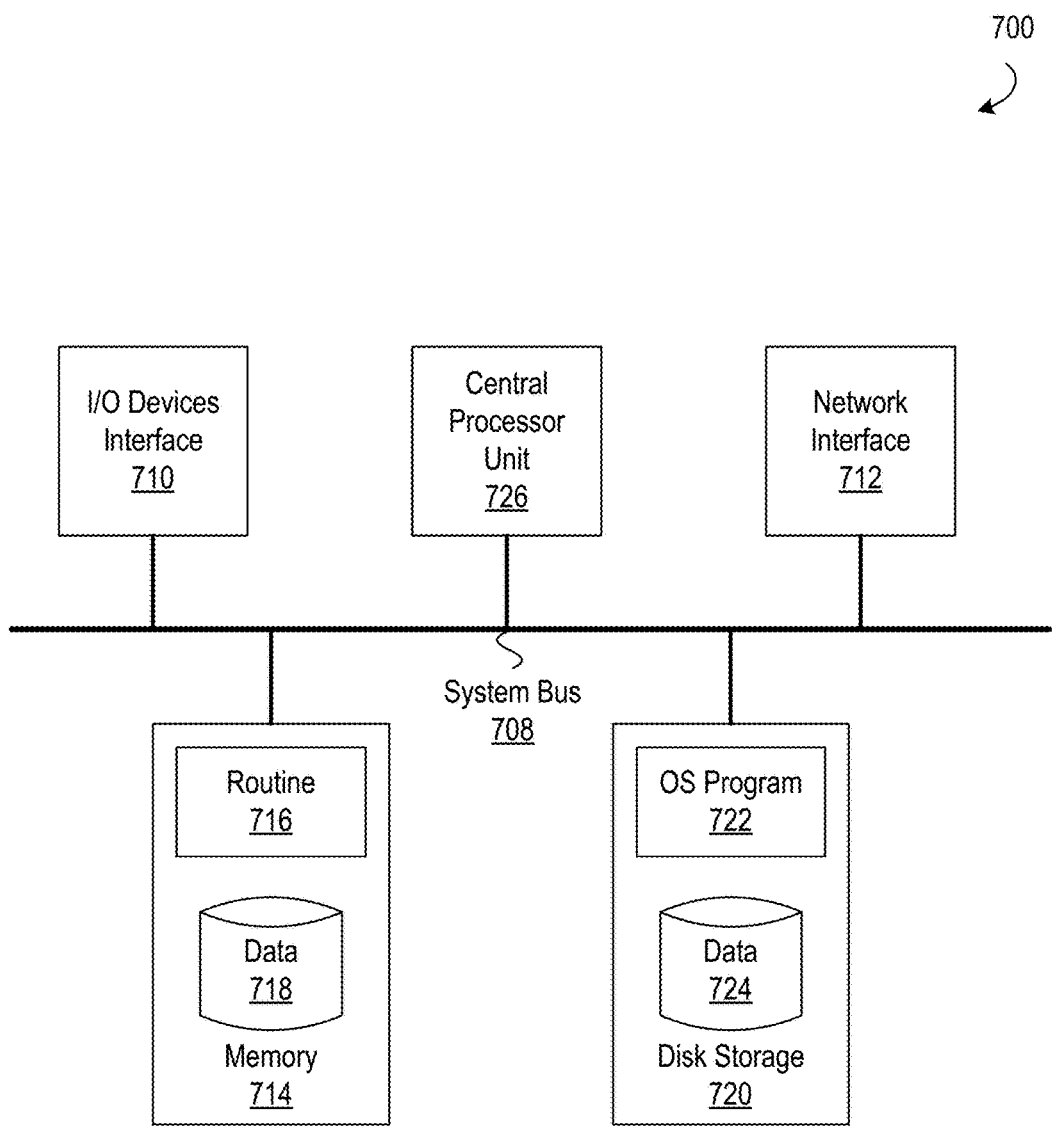
FIG. 7 depicts a block diagram of an exemplary computing device that may be used to implement one or more aspects described herein.
Figure 8:
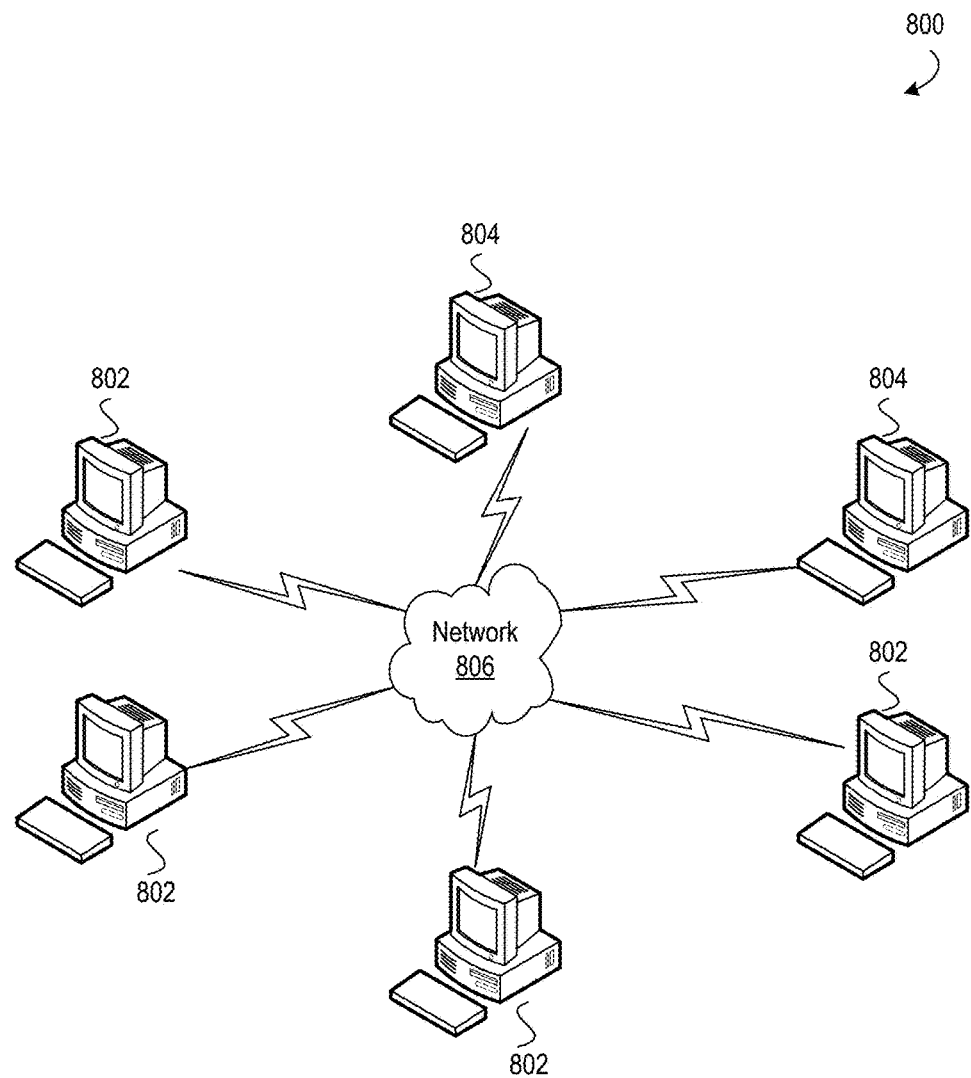
FIG. 8 depicts an example of an implementation of a computing environment in which aspects of the present disclosure may be implemented.

Having described an example computing device and methods for implementing techniques related to audiovisual speech recognition using scattering operators, additional details regarding the computing device and operating environment will be discussed. FIG. 7 illustrates a block diagram of an exemplary computing device and FIG. 8 illustrates an exemplary computing environment in which one or more aspects described herein may be implemented.

FIG. 7 illustrates a block diagram of a computing device 700 that may be used to implement one or more aspects described herein, such as computing device 102 of FIG. 1. The computing device 700 contains system bus 708, where a bus is a set of hardware lines used for data transfer among the components of a computing device or processing system. Bus 708 is essentially a shared conduit that connects different elements of a computing device (e.g., processor, disk storage, memory, input/output ports, network ports, etc.) that enables the transfer of information between the elements. Attached to system bus 708 is I/O device interface 710 for connecting various input and output devices (e.g., keyboard, mouse, microphone, camera, displays, printers, speakers, etc.) to the computing device 700. Network interface 712 allows the computing device to connect to various other devices attached to a network (e.g., network 806 of FIG. 8). Memory 714 provides volatile storage for computer software instructions 716 and data 718 used to implement aspects described herein (e.g., a recommendation engine implementing the steps detailed above). Disk storage 720 provides non-volatile storage for computer software instructions 722 and data 724 used to implement various aspects of the present disclosure. Central processor unit 726 is also attached to system bus 708 and provides for the execution of computer instructions.

In one embodiment, the processor routines 716 and 722 as well as data 718 and 724 are a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. The computer program product can be installed by any suitable software installation procedure, as is well known in the art. At least a portion of the software instructions may also be downloaded over a cable, communication and/or wireless connection. Computer-readable media include all computer-readable media but do not include transitory propagating signals.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

In FIG. 8, an example of an implementation of a computing environment 800 in which aspects of the present disclosure may be implemented is shown. Client computing devices 802 and server computing devices 804 provide processing, storage, and input/output devices executing application programs and the like. Client computing devices 802 may include, e.g., desktop computers, laptop computers, tablet computers, palmtop computers, smartphones, smart televisions, and the like. Client computing devices 802 can also be linked through communications network 806 to other computing devices, including other client devices computing devices 802 and server computing devices 804. Communications network 806 can be part of a remote access network, a global network (e.g., the Internet), a cellular network, a worldwide collection of computers, local area or wide area networks, and gateways that currently use respective protocols (TCP/IP, Bluetooth, etc.) to communicate with one another. Other electronic device/computer network architectures are suitable.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
  receiving, by a computing device, audiovisual input comprising audio input and video input associated with a subject;
  extracting, by the computing device, visual features from the video input;
  applying, by the computing device, a scattering operation to the extracted visual features to generate a vector of scattering coefficients;
  providing the vector of scattering coefficients as input to a first neural network for visual processing;
  providing the audio input to a second neural network for audio processing;
  combining, by the computing device, a first output of the first neural network with a second output of the second neural network to generate a fused audiovisual feature vector based on the audiovisual input;
  providing the fused audiovisual feature vector to a third neural network for audiovisual processing; and
  generating, by the computing device and using the third neural network, a first prediction regarding a speech status of the subject based on the fused audiovisual feature vector.

2. The method of claim 1, wherein providing the vector of scattering coefficients as input to the first neural network for visual processing comprises:
  normalizing the vector of scattering coefficients to generate a first normalized vector of scattering coefficients;
  aggregating a plurality of normalized vectors of scattering coefficients including the first normalized vector of scattering coefficients to generate a set of aggregated visual feature vectors; and
  providing the set of aggregated visual feature vectors to the first neural network for visual input processing.

3. The method of claim 1, wherein the video input is sampled at a first frequency and the audio input is sampled at a different second frequency.

4. The method of claim 1, wherein the vector of scattering coefficients is in a first dimensional space, and wherein applying the scattering operation to the extracted visual features to generate the vector of scattering coefficients comprises:
  applying the scattering operation to the extracted visual features to generate a second vector of scattering coefficients in a second dimensional space; and
  projecting the second vector of scattering coefficients into the first dimensional space to generate the vector of scattering coefficients in the first dimensional space,
  wherein the second dimensional space is of a higher dimensionality than the first dimensional space.

5. The method of claim 1, wherein applying the scattering operation to the extracted visual features to generate a vector of scattering coefficients comprises generating first order scattering coefficients and second order scattering coefficients.

6. The method of claim 1, further comprising:
  generating, by the computing device and using the first neural network, a second prediction regarding the speech status of the subject based on the vector of scattering coefficients; and
  generating, by the computing device and using the second neural network, a third prediction regarding the speech status of the subject based on the audio input; and
  combining the first prediction, the second prediction, and the third prediction to generate a combined prediction regarding the speech status of the subject.

7. The method of claim 1, wherein the first prediction regarding the speech status of the subject is used to recognize speech content of the audiovisual input.

8. The method of claim 1, further comprising:
  determining, based on the first prediction regarding the speech status of the subject, a synchrony state of the audio input and the video input, wherein the synchrony state indicates whether the audio input is in-sync with the video input.

9. The method of claim 1, further comprising:
  determining, based on the first prediction regarding the speech status of the subject, whether speech in the audio input originates from a foreground source or a background source.

10. One or more non-transitory computer readable media comprising instructions that, when executed by one or more processors, cause the one or more processors to perform steps comprising:
  receiving audiovisual input comprising audio input and video input associated with a subject;
  extracting visual features from the video input;
  applying a scattering operation to the extracted visual features to generate a vector of scattering coefficients in a first dimensional space;
  providing the vector of scattering coefficients as input to a first neural network for visual processing;
  providing the audio input to a second neural network for audio processing;
  combining a first output of the first neural network with a second output of the second neural network to generate a fused audiovisual feature vector based on the audiovisual input;
  providing the fused audiovisual feature vector to a third neural network for audiovisual processing; and
  generating, using the third neural network, a prediction regarding a speech status of the subject based on the fused audiovisual feature vector.

11. The one or more non-transitory computer readable media of claim 10, wherein providing the vector of scattering coefficients as input to the first neural network for visual processing comprises:
  normalizing the vector of scattering coefficients to generate a first normalized vector of scattering coefficients;
  aggregating a plurality of normalized vectors of scattering coefficients including the first normalized vector of scattering coefficients to generate a set of aggregated visual feature vectors; and
  providing the set of aggregated visual feature vectors to the first neural network for visual input processing.

12. The one or more non-transitory computer readable media of claim 10, wherein the video input is sampled at a first frequency and the audio input is sampled at a different second frequency.

13. The one or more non-transitory computer readable media of claim 10, wherein applying the scattering operation to the extracted visual features to generate the vector of scattering coefficients comprises:
  applying the scattering operation to the extracted visual features to generate a second vector of scattering coefficients in a second dimensional space; and
  projecting the second vector of scattering coefficients into the first dimensional space to generate the vector of scattering coefficients in the first dimensional space,
  wherein the second dimensional space is of a higher dimensionality than the first dimensional space.

14. The one or more non-transitory computer readable media of claim 10, wherein the prediction regarding the speech status of the subject is used to recognize speech content of the audiovisual input.

15. The one or more non-transitory computer readable media of claim 10, wherein the prediction regarding the speech status of the subject is used to determine a synchrony state of the audio input and the video input, wherein the synchrony state indicates whether the audio input is in-sync with the video input.

16. The one or more non-transitory computer readable media of claim 10, wherein the prediction regarding the speech status of the subject is used to determine whether speech in the audio input originates from a foreground source or a background source.

17. An apparatus comprising:
one or more processors; and
memory storing instructions that, when executed by the one or more processors, cause the apparatus to:
receive audiovisual input comprising audio input and video input associated with a subject;
extract visual features from the video input;
apply a scattering operation to the extracted visual features to generate a vector of scattering coefficients;
provide the vector of scattering coefficients as input to a first neural network for visual processing;
provide the audio input to a second neural network for audio processing;
combine a first output of the first neural network with a second output of the second neural network to generate a fused audiovisual feature vector based on the audiovisual input;
provide the fused audiovisual feature vector to a third neural network for audiovisual processing; and
generate, and using the third neural network, a first prediction regarding a speech status of the subject based on the fused audiovisual feature vector.

18. The apparatus of claim 17, wherein the video input is sampled at a first frequency and the audio input is sampled at a different second frequency.

19. The apparatus of claim 17, wherein the vector of scattering coefficients is in a first dimensional space, and wherein the instructions, when executed by the one or more processors, further cause the apparatus to:
generate, using the first neural network, a second prediction regarding the speech status of the subject based on the vector of scattering coefficients; and
generate, using the second neural network, a third prediction regarding the speech status of the subject based on the audio input; and
combine the first prediction, the second prediction, and the third prediction to generate a combined prediction regarding the speech status of the subject.

20. The apparatus of claim 17, wherein the instructions, when executed by the one or more processors, further cause the apparatus to:
determine, based on the first prediction regarding the speech status of the subject, whether speech in the audio input originates from a foreground source or a background source.

* * * * *